April 15, 1930.  H. L. BUDD  1,754,814
FRAME CLIP
Filed Dec. 13, 1928
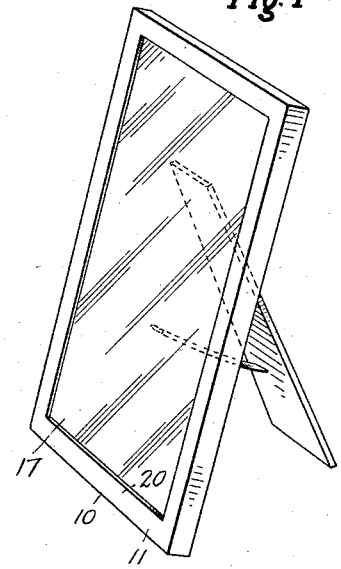
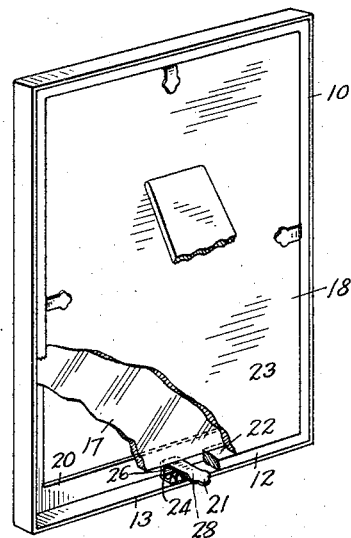
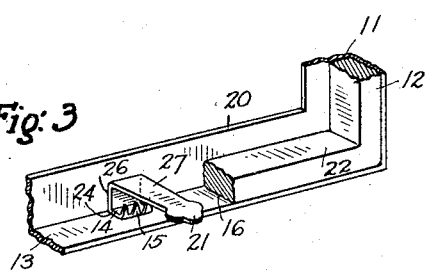
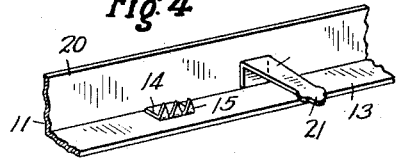
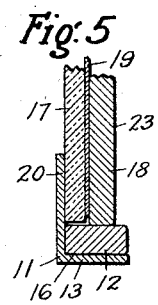
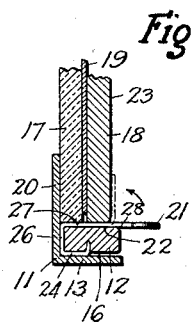
INVENTOR
Howard L. Budd
BY
ATTORNEY Patented Apr. 15, 1930

1,754,814

UNITED STATES PATENT OFFICE

HOWARD L. BUDD, OF BROOKLYN, NEW YORK, ASSIGNOR TO FRIEDMAN SILVER CO., INC., OF BROOKLYN, NEW YORK, A CORPORATION OF NEW YORK

FRAME CLIP

Application filed December 13, 1928. Serial No. 325,676.

This invention relates to frames of the type adapted to hold a picture, photograph or mirror removably therein and relates particularly, to the means for holding the various parts inserted into the frame positively in place against accidental removal or displacement. Such frames are usually elaborately and carefully finished all over, the back being finished by means of velvet covering or the like, since the frame is often so mounted that the back is visible as well as the front.

My invention is applicable to various types of frames, and particularly, to frames of the easel type which are designed to stand on a flat surface such as a dressing-table or desk. The back of the frame may be fitted with a hinged easel brace, said back being often held in place merely by friction against an inner frame or rim, so that it may be pried out or otherwise removed and a new picture, glass or mirror substituted when desired. In such frames, the back is frequently made of wood or the like and though protected with suitable material such as velvet, sometimes shrinks or warps. Often, the back is originally made insufficiently tight to resist the pressure of the glass and the weight of the other parts thereon, so that the back is likely, under certain conditions, to fall out or become displaced. Since frames of this type are used for ornamental purposes and are more or less elegantly finished, holding means for the back, which might be visible and detract from the pleasing appearance of the frame are not usually provided.

It becomes advisable, however, in view of the above, to provide positive means for holding the various parts in place against possible displacement, which means, if visible, would not detract from the good appearance of the frame. Said holding means should also be so designed as to make it easy for the user to remove the back when it is desired to repair or replace the parts held in the frame.

My invention contemplates the provision of positive holding means for the back, which means may be easily moved out of the way, so that the back may itself be removed from the frame when desired, irrespective of how tightly or loosely the back fits into the frame.

My invention further contemplates the provision of such holding means, applicable to frames of any shape, whether rectangular, circular, elliptical or otherwise, and to frames made of any suitable material such as metal, wood, celluloid or other materials customarily used for frames.

It will be understood that my invention is applicable with equal facility and advantages to frames other than those of the easel type, and that I do not intend to be understood as limiting myself to that type alone.

The various objects of my invention will be clear from the description which follows, and from the drawing, in which, Fig. 1 is a perspective view of an easel frame to which my invention may be applied.

Fig. 2 is a similar view of the same, partly broken away to show the underlying parts and showing my improved clip.

Fig. 3 is a similar view of a portion of the frame, the rim and the clip.

Fig. 4 is a similar view of a portion of the frame, showing a modified form of my improved holding means.

Fig. 5 is a sectional view of the frame showing the various parts assembled in place, and Fig. 6 is a similar view showing my improved clip in full lines as it appears before it is bent on to the rear face of the frame, and in dotted lines, the position assumed by the finger piece after it is bent into back holding position.

In the practical embodiment of my invention illustrated by way of example, the frame 10 is shown as rectangular in outline, and as composed of a number of pieces 11, L-shaped in cross-section and suitably ornamented on the exposed faces thereof. Inside of the frame 10 is fitted an inner frame or rim 12, made as thin as possible, and designed to fit tightly into and secured permanently within the inside of the flanges 13 of the frame 10. To insure the permanent attachment of the rim in place, it may be secured to the frame in any suitable manner, such as by means of glue or the like, though it is understood that the adhesive material may be omitted if desired.

For additional safety and to insure that the rim does not become displaced relatively to the frame should the glue dry out, or under stress in handling, I prefer to provide one or more pronged members as 14 which are suitably secured to one or the other of the flanges of the frame as 13 at various points such as at one or both ends or at the sides, as may be found convenient or desirable, and which are preferably made of thin sheet metal. As illustrated in Figs. 3 and 4, a plurality of prongs 15 are made at one end of a single member 14, though it will be understood that any number of prongs may be used, and that a number of the members carrying the prongs may be widely separated and variously spaced about the frame.

The prongs 15 are preferably arranged to engage the outermost edge 16 of the rim 12, when the rim is fitted into the inside of the frame, said rim being made sufficiently flexible to be bent to pass the prongs when the rim is inserted into place. When only a single pronged member 14 is used, or when only two such members are used and arranged on adjacent sides of the frame, it becomes unnecessary to bend the rim when fitting it into the frame. The inner dimensions of the rim 12 are preferably such that the glass or mirror 17 may fit inside of the rim 12 (Fig. 2) as does the back member 18 and the picture member 19, the glass 17 resting on the annular rim formed by the inner peripheries of the flanges 20 of the frame. As illustrated in Figs. 2, 3 and 6, my improved holding means, in addition to the pronged member 14 consists of a finger piece 21 integral with said member 14 and of sufficient length to allow it to be bent around the part of the inside edge 22 of the rim and then on to the rear face 23 of the back 18 to hold the back removably in place. In this modification, the portion 24 is secured to the flange 13 of the frame, with the prongs parallel to the flange 20. The portion 26 may be secured to the flange 20 while the tab portion 27 engages the edge 22, and the end 28 of the tab engages the rear face 23.

As illustrated in Fig. 4, the pronged member 14 may be made independently of the finger piece or tab 21 and may be spaced therefrom if desired. In either case, the finger piece provides a positive means, easily bent out of the way of the back, for normally holding the back against accidental displacement, while allowing the back to be removed when desired, for the replacement, repair, inspection or cleaning of the parts. In the modifications shown and described, both of the holding members 14 and 21 are preferably made of thin sheet metal.

The finger piece 21 lends itself readily to ornamentation of various types so that it enhances instead of detracting from the good appearance of the frame. The pronged member 14 is preferably entirely concealed by the rim and is therefore usually invisible when the frame is in use, while providing a positive means for holding the rim in place independently of whatever other means may also be employed for that purpose. It will be understood that the various portions of the pronged member 14 may be secured to the frame flanges in various ways such as by solder, rivets, screws or the like, depending on the material from which the frame is made. It will be further understood that the various portions 24 and 26 of my improved clip may be secured in other positions to the flanges 13 and 20 than above described, and that other obvious changes may be made in the structure shown and described.

I therefore do not wish to be understood as limiting myself to the specific structure illustrated and described but intend to claim my invention as broadly as may be permitted by the state of the prior art and the scope of the appended claims.

I claim:

1. The combination with a frame substantially L-shaped in cross-section, and having a front flange and a second rearwardly extending flange, of a pronged member secured to the rearwardly extending flange of the frame, an annular rim adapted to fit into said frame in the angle formed by said flanges and engageable near the rear of its outermost surface by the prongs of said member, and an L-shaped flexible tab having the shorter leg thereof secured to the rear face of the front flange and adjacent the front face of the rim and the longer leg arranged parallel to and in inwardly spaced relation to the inner face of the second flange and in contact with the inner edge of said rim for holding the rim in place, and of sufficient length to have the end portion of the longer leg bent again inwardly on to the rear face of a back member within said rim.

2. The combination with a frame having a front flange and a rearwardly extending flange at substantially right angles to the front flange, of an annular rim fitted into said frame in the interior angle formed by said flanges, a pronged member secured to the inner face of the rearwardly extending flange, the prongs of said member extending inwardly of said inner face and being substantially parallel to and in spaced relation to said front flange, a flexible tab integral with the pronged member and having the free end portion thereof arranged substantially parallel to and in inwardly spaced relation to the rearwardly extending flange and adapted to engage the inner edge and front face of the rim, and having an intermediate portion at right angles to and joining said end portion and said pronged member, said intermediate portion being secured to the inner face of the front flange of the frame, and a back member removably held to said frame by the end portion of said tab when the end portion is bent inwardly away from and independent of the rim.

3. The combination with a frame, of a rim inserted thereinto, a pronged member secured to the frame and adapted to engage and penetrate the peripheral edge of said rim adjacent to the frame and other than the front or back of the rim, a comparatively long L-shaped tab secured to the frame and having the longer leg thereof spaced from the frame throughout its length and arranged adjacent the inner edge of said rim, and a back member frictionally fitted into said rim and adapted to be removably held in place by said tab on the bending of the end portion of said longer leg away from the rim on to the rear face of the back member, said end portion being out of contact with the rim in all operative positions thereof.

4. In combination with a frame, a securing clip permanently secured to said frame, and comprising a pronged element at one end of said clip having terminal prongs projecting inwardly from the frame on the inside thereof and in spaced relation to and parallel to the inner face of the front of the frame and being thereby exposed, and an elongated flexible finger piece at the other end of said clip and integral therewith, spaced from and substantially parallel to the adjacent inner peripheral surface of the frame, said clip including an intermediate portion integral with and joining the finger piece and the pronged element and being arranged at substantially right angles thereto, and said intermediate portion being arranged adjacent the inner face of the front of the frame.

5. In combination with a frame having a front flange and a rearwardly extending flange, a rim inserted thereinto between the flanges and a back fitting inside of the rim, of a flat metallic member having its end portion secured to the inner face of the front flange and having part of the remaining portion thereof substantially at right angles to the end portion and passing about the inner edge of the rim to the rear face thereof, the other end portion of said member being adapted to be bent inwardly on the rear face of the back for removably holding the back in place, said member being substantially L-shaped in operative position, and said other end portion being out of contact with the rim.

6. The combination with a frame, a rim fitting inside of the frame, and a back frictionally inserted inside of the rim, of pointed means permanently secured to the frame for entering an outer side edge of the rim and thereby holding the rim against removal, and a flexible tab integral with the pointed means, in contact with the inner edge of the rim, and adapted to be bent inwardly upon the rear face of the back for removably holding the back in place.

7. The combination with a metallic frame having a front flange arranged in a substantially vertical plane, and a second rearwardly extending flange at substantially right angles thereto, of a centrally apertured rim of comparatively soft material fitted into said frame with the outer peripheral surface thereof in contact with the rear face of said front flange and the front face thereof in contact with the inner face of said second flange, the members of said rim being of less width than that of either of said flanges, a back for said frame fitted into the aperture of said rim, and means for removably holding said rim and said back in place comprising a thin and substantially flat metallic member of a single piece of material having an end portion, of less length than the width of said second flange, secured to the inner face of said second flange and terminating in prongs outstanding inwardly toward the aperture of said rim and in spaced relation to said front flange and substantially parallel thereto and entirely outside of said frame, said member having an intermediate portion at substantially right angles to said end portion and adapted to contact with the rear face of said front flange, and being of substantially the same height as the width of said rim, and said member having its other end portion bent from the inner extremity of said intermediate portion, and extending at substantially right angles thereto, and of greater length than the thickness of said rim, and in spaced relation and parallel to said first-mentioned end portion and adapted to have the terminal part thereof bent inwardly at substantially right angles to the remainder of said end portion toward the aperture of said rim and against the rear face of the back.

8. In a frame, a rim, a pronged element for engaging an outer side edge of said rim, and a flexible member extending rearwardly of the frame and secured thereto and adapted to have part thereof bent about the inner side edge of said rim and the remainder thereof bent inwardly past said rim and out of contact therewith.

HOWARD L. BUDD.